Feb. 26, 1935.  H. D. ELSE  1,992,818
HIGH SPEED BEARING
Filed April 27, 1929   3 Sheets-Sheet 1

INVENTOR
Harry D. Else.
BY
ATTORNEY

Feb. 26, 1935.  H. D. ELSE  1,992,818
HIGH SPEED BEARING
Filed April 27, 1929　　3 Sheets-Sheet 2

INVENTOR
Harry D. Else.
BY
Chesley L. Carr
ATTORNEY

Feb. 26, 1935.  H. D. ELSE  1,992,818
HIGH SPEED BEARING
Filed April 27, 1929   3 Sheets-Sheet 3

INVENTOR
*Harry D. Else.*
BY
*Wesley G. Carr*
ATTORNEY

Patented Feb. 26, 1935

1,992,818

UNITED STATES PATENT OFFICE 1,992,818

HIGH-SPEED BEARING

Harry D. Else, Springfield, Mass., assignor to Westinghouse Electric & Manufacturing Company, a corporation of Pennsylvania Application April 27, 1929, Serial No. 358,614

19 Claims. (Cl. 308—187)

My invention relates to bearings for rotating parts and has particular relation to means for lubricating the bearings of a high-speed shaft.

An object of my invention is to provide a lubricating system which shall be suitable for shafts which rotate at high speeds.

Another object of my invention is to provide a lubricating system arranged in such manner that there is no rubbing contact between the rotating and stationary parts of the lubricating system.

Another object of my invention is to provide means for feeding only a limited quantity of lubricant in a finely divided condition to the bearings while the shaft is rotating.

A still further object of my invention is to provide a lubricating system of the above description which shall be sturdy and inexpensive in construction and maintenance, yet simple in operation.

In lubricating the antifriction bearings of high-speed rotating shafts, it is essential that only a limited amount of lubricant shall be supplied continuously to the bearings during the period the shaft is rotating.

The amount of lubricant supplied should be sufficient to provide efficient and continuous lubrication of the bearings but should not exceed the amount required for lubricating purposes because any accumulation of the lubricant around the moving parts of the bearing, in excess of that required to properly lubricate the parts, increases the friction of the operating parts, resulting in heating of the bearings and a substantial increase in friction over a bearing which is properly lubricated.

My invention is intended to obviate the difficulties before mentioned. The invention may be better understood by reference to the accompanying drawings, taken into consideration with the description of the system.

In practicing my invention, I provide, in combination with a structure utilizing a shaft adapted to rotate at high speeds and an anti-friction bearing, a main lubricant-containing chamber located adjacent to the shaft and so constructed that the lubricant does not come into direct contact with the rotating shaft, and an auxiliary chamber partly or wholly surrounding a portion of the shaft, a porous means disposed between the main and the auxiliary chambers for permitting a slow and substantially constant flow of lubricant between them, means for throwing the lubricant, which seeps into the auxiliary chamber, upon the bearing and additional means for returning excess lubricant to the main chamber.

Figure 1:
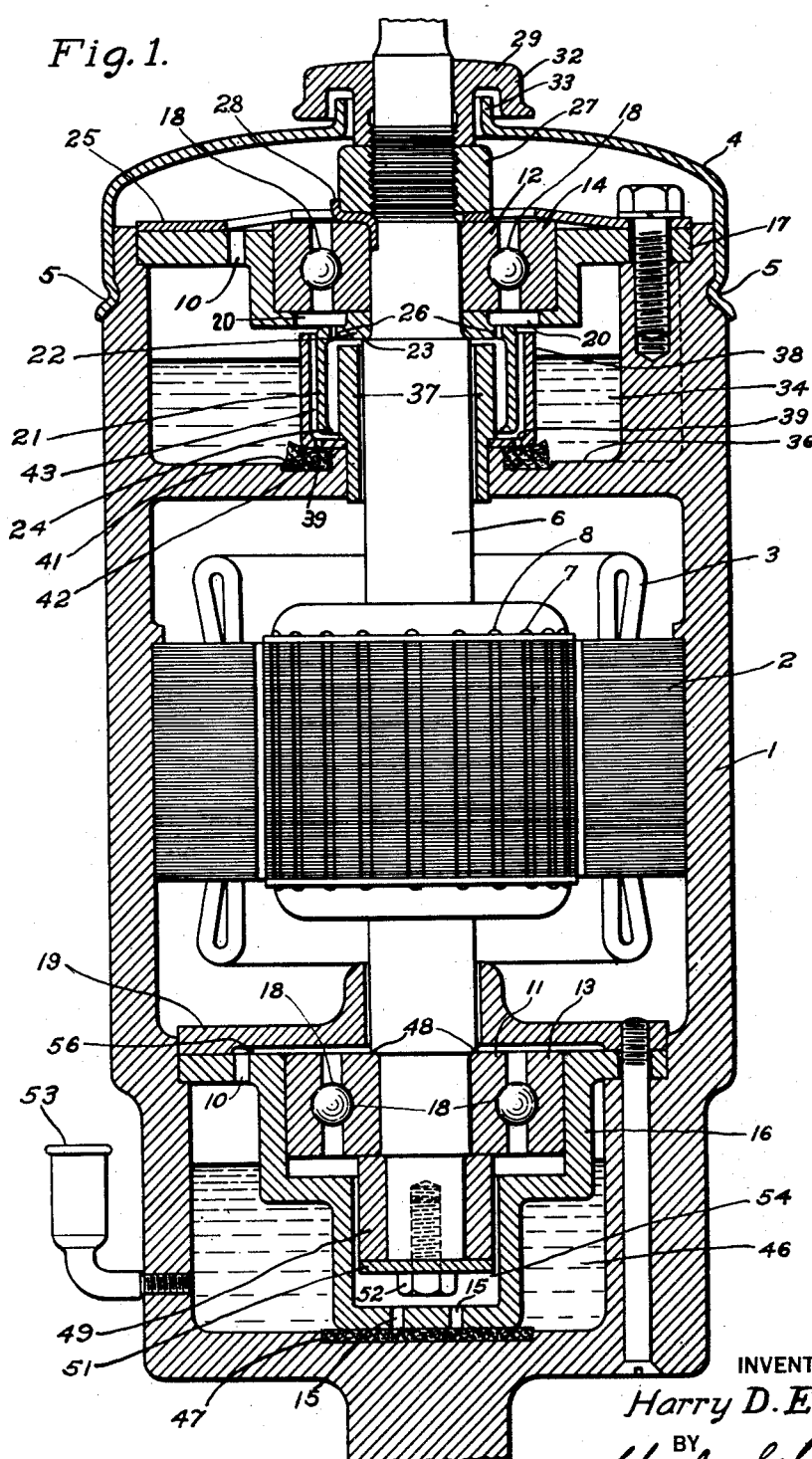
Figure 1 is a view, partly in elevation and partly in section, of an electric motor adapted to utilize two embodiments of my device for lubricating the bearings thereof.

In Fig. 1, I have shown an electric motor adapted to utilize two embodiments of my lubricating device. The motor, with the exception of the bearings and the lubricating device, is of a construction known to the art and includes a hollow frame 1 adapted to engage and hold the stationary core 2 and coils 3 in the usual manner. The lower end of the frame is substantially a closed structure, and the upper end is adapted to be closed by means of the resilient cap 4 provided with fingers 5 which engage suitable depressed portions of the frame to hold the cap in place.

The rotor includes a shaft 6 upon which is mounted the rotor core 7 and conductor 8. The bearings, of which there are two, one at each end, comprise rotating bearing parts or races 11 and 12 which are engaged on the shaft and rotate with it. The stationary races 13 and 14 engage the motor frame by means of suitable cup-shaped members 16 and 17. The cup-shaped members have openings 10 in their upper horizontal parts and openings 15 and 20 in their lower horizontal parts, for purposes to be hereinafter explained. Balls 18 are disposed between the stationary and the rotating parts of the bearing in the usual manner, and the stationary parts of the bearings are held in position in the upper bearing by means of a disc 25 and in the lower bearing, by means of a plate 19.

Referring now more particularly to the upper bearing, I provide an inverted cup-shaped member 21 having a shoulder portion 22 adapted to engage a flange or shoulder 23 on the shaft 6. The cup-shaped member 21 is provided with a small flange 24 at its lower inside wall, and openings 26 in the horizontal portion of the cup, for a purpose to be hereinafter explained.

The rotating race 12 of the bearing rests on top of the cup-shaped member 21, hereinafter termed a flinger, and the rotating race 12 and the flinger are adapted to be held in place against the shoulder 23 and on the shaft 6 by means of a nut 27 which has threaded engagement with it. A lock washer 28 furnishes a means for holding the nut in place on the shaft and preventing it from unscrewing. An inverted cup member 29, is adapted to be threaded on the same threads of the shaft 6 which are utilized in connection with the nut 27, and the down-turned flange 32 of member 29 constitutes, with an upturned flange 33 of cap 4, a baffle which prevents excess oil from passing out of the motor and also prevents dust and dirt from getting into it.

The housing 1 is provided with a horizontal wall portion 36 which surrounds the shaft 6 and constitutes a chamber 34, hereinafter termed the main lubricant-containing chamber. A cylindircal member 37 is engaged by the wall 36 and closely surrounds the shaft 6. The cylinder 37 also is adapted to hold in place a cup-shaped member 38 which is provided with openings 39 at its lower part for a purpose to be hereinafter explained.

A recess 41 is provided between the wall 36 and the cup-shaped member 38, and a porous washer 42 of felt or like material is disposed within the recess in such manner that the openings 39 of the cup-shaped member 38 are covered by the washer. The amount of lubricant to be admitted to the bearings may be regulated by varying the degree of compression of the washer and the size and location of the openings.

In operation, the chamber 34 is filled with lubricant nearly to the top of the cup-shaped member 38, and a small amount of lubricant seeps through the porous washer 42 and into the chamber 43 inside of a cup-shaped member 38, hereinafter called the auxiliary chamber. As soon as the lubricant reaches the flinger 21, it is thrown upwardly and outwardly by reason of the high speed of the shaft and flinger, so that it is broken up into a fine mist. Part of the lubricant is caught on the inside of the flinger 21 and passes through openings 26, and between the moving and stationary parts of the bearing under the action of centrifugal force.

Because of the high speed of the balls and rotating parts of the shaft, any excess lubricant is thrown off the shaft and rotating parts and passes back into the main chamber 34, either directly or through openings 20 or openings 10 of the disc 17. In this manner, only a small amount of lubricant is delivered to the bearing, and any excess lubricant is returned to the main chamber. There are no rubbing parts, such as wicks and the like, which parts are subject to wear and which cause friction.

The structure shown in the lower portion of the motor is constructed and operates in substantially the same way as the structure of the upper bearing. A main chamber 46 is provided in the lower portion of the housing, and a porous washer 47 is disposed within a suitable recess of the housing between the lower wall of the housing and the cup-shaped member 16. The rotating part 11 of the bearing is held in place against a shoulder 48 on the shaft by means of a cylinder 49 and washer 51, which are held in place by means of a screw 52. The cup-shaped member 16 is disposed to provide an auxiliary chamber 54 surrounding the lower part of the shaft.

In operation, lubricant is introduced into the main chamber 46 through cups 53, and the lubricant seeps through the porous washer 47 and through the openings 15 of the cup 16 into the auxiliary chamber 54 formed in the lower portion of the cup 16 surrounding the lower end of the shaft 6. The lubricant is picked up by the screw 52 and passes upwardly and outwardly on washer 51, cylinder 49 and the rotating bearing part 11 to the balls 18 and surfaces of races 11 and 13. Excess lubricant passes outward, through an opening 56 between cap 19 and stationary race 13 and cup-shaped member 16 and through the opening 10, into the main chamber 46.

Figure 2:
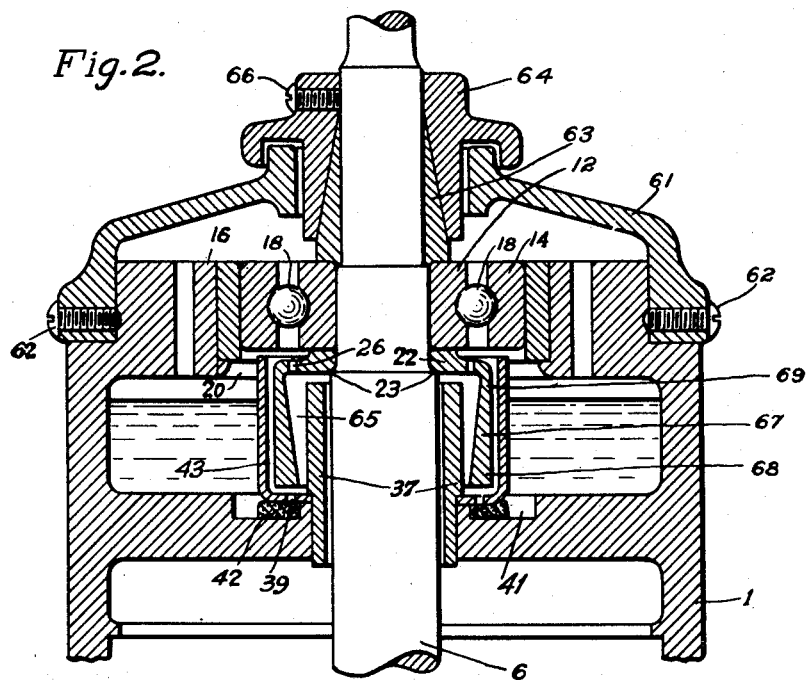
Fig. 2 is a view, partly in elevation and partly in section, of a portion of a structure utilizing another embodiment of my invention.

The structure shown in Fig. 2 is, in its essential parts, substantially the same as that shown in the upper bearing of the motor of Fig. 1. The stationary parts of the housing are substantially the same as shown in Fig. 1, except that the cap 61 engages the housing 1 by means of set-screws 62. The rotating parts are substantially the same as in Fig. 1, except that the rotating portion 12 of the bearing is held in place on the shaft 6 by means of a tapered collar 63 and a combined nut-and-cover 64 locked in place by means of a set screw 66. The flinger 67, however, is of a modified construction in that the vertically extending wall tapers from a given dimension at the lower part 68 to a substantially smaller thickness at the upper part 69, the taper being on the inside part of the flinger.

By this construction of the flinger, a portion of the lubricant which seeps into the auxiliary chamber 43 passes to the inner part 65 of the flinger and is thrown upwardly by reason of the slope of the inner wall of the flinger and through the openings 26 to the bearings in greater quantity than in the bearing structure shown in Fig. 1. By utilizing varying degrees of slope or taper in the wall 67, it is possible to vary the amount of lubricant delivered to the bearing. This is of substantial importance as it is very desirable, at times, to regulate the amount of lubricant to be delivered to a bearing of a given type.

Figure 3:
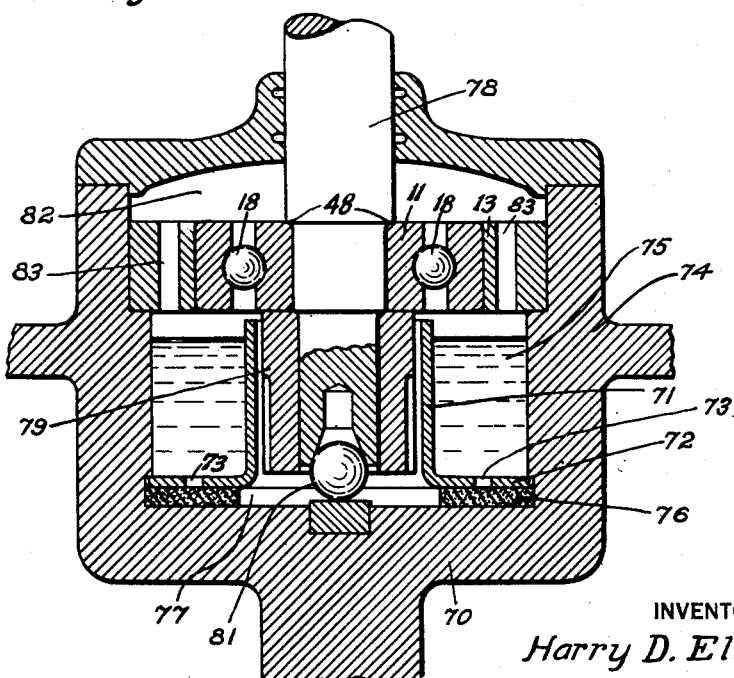
Fig. 3 is a view, partly in elevation and partly in section, of a structure utilizing another embodiment of my invention.

The embodiment of my invention shown in Fig. 3 is substantially the same as the structure shown in the lower part of Fig. 1, except that, in place of the cup-shaped member 16, a collar 71, having a horizontally extending flange portion 72 in which are located openings 73, is employed to form, with the wall 74 of the housing, a main lubricant-holding chamber 75. A porous washer 76 is disposed beneath the flange 72 of collar 71 and is arranged to cover the openings 73. The collar 71 and the lower wall 70 of the housing 74 constitute an inner or auxiliary chamber 77, and lubricant from the main chamber 75 passes through the openings 73, seeps through the washer 76 and into the auxiliary chamber 77, where it is picked up by the bearing 81 and thrown upwardly and outwardly, by means of the shaft 78 and collar 79, to the moving parts of the bearing. Excess lubricant passes into the space 82 above the bearing and drains off, through openings 83, back into the main chamber 75. This type of construction is more desirable in certain shaft applications.

Figure 4:
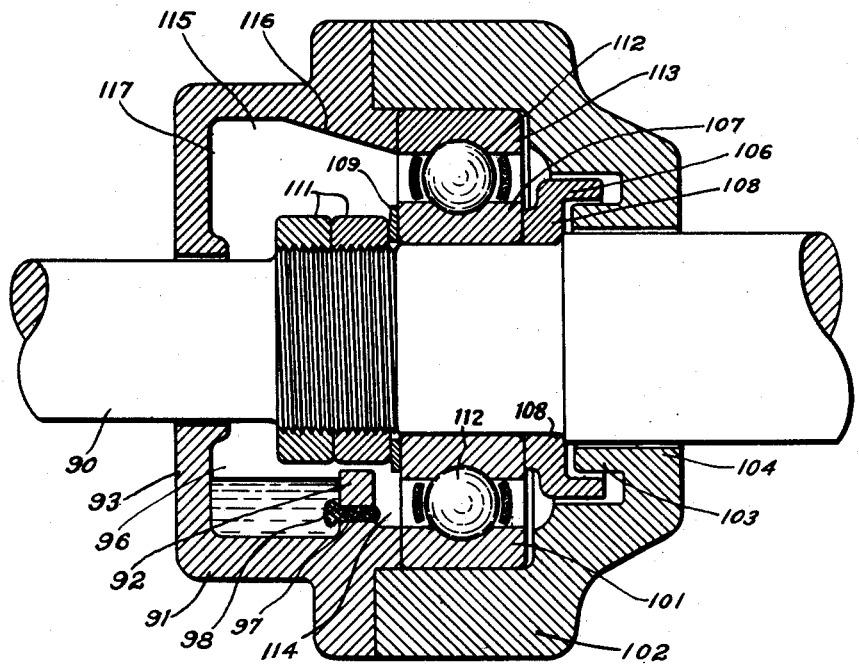
Fig. 4 is a view, partly in elevation and partly in section, of another structure utilizing my lubricating device, in which the rotating shaft is horizontally mounted.

In Fig. 4 is shown an embodiment of my invention suitable for a horizontally arranged shaft, such as the shaft 90. A housing 91 is provided with a flange 92 such that it constitutes, with a vertically-extending wall 93, a lubricant-containing chamber 96. One or more openings 97 are provided in the flange 92, and a porous wick 98 is inserted in each of the openings. A stationary portion or race 101 of the bearing is engaged between the housing 91 and a frame 102. The frame 102 is provided with a flange 103 adapted to close the lubricant-containing chambers. The flinger 106, the operation of which is hereinafter explained, and the rotating part or race 107 of the bearing, are held in place against a shoulder 108 of shaft 90 by means of washer 109 and lock nuts 111 which are in threaded engagement with the shaft. Balls 112 and cages 113, of the usual construction, are employed.

In operation, the main lubricant-receiving chamber 96 is filled with lubricant that seeps through the wicks 98 into the auxiliary chamber 114 which immediately surrounds a portion of the moving parts of the bearing. The lubricant is picked up by the moving race and broken up into a fine spray which lubricates the bearing. Excess lubricant is thrown upwardly, by means of the rotating parts of the shaft and by means of the flinger 106, into a chamber 115 in the upper part of housing 93. By reason of the sloping wall 116 of the chamber 115, the lubricant is conducted into the outer part 117 of the main chamber where it falls downward and into the main lubricant supply. The flinger 106 assists in preventing the lubricant from passing along the shaft into the machine by flinging the lubricant outwardly and breaking it into a fine mist. The arrangement of parts and the structure shown in Fig. 4 are particularly desirable for high-speed shafts which are mounted in horizontal positions.

Figure 5:
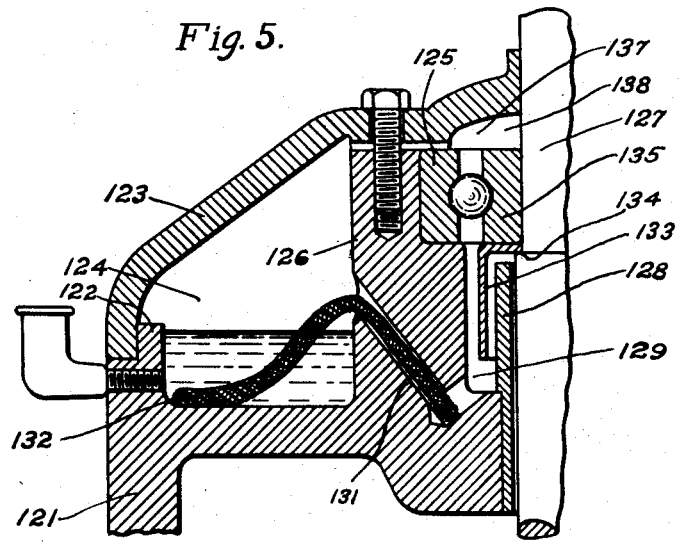
Fig. 5 is a view, in section, of a structure utilizing still another embodiment of my invention.

In Fig. 5 is shown still another embodiment of my invention in which oil or lubricant is conducted from the main chamber to the auxiliary chamber by means of a wick which first rises and then falls, in conducting the oil from the main storage chamber to the auxiliary lubricant chamber. The structure includes a housing 121 having a flange 122 for engaging the cap 123 and for constituting one wall of the main lubricant-containing chamber 124, and a second flange 126 is adapted to surround the shaft 127 and to engage the stationary race 125 of the bearing. The flange 126 also constitutes the inner wall of the main chamber 124 and, in addition, constitutes, with a collar 128, an auxiliary chamber 129. An opening 131 is provided through the flange 126 to afford communication between the main chamber 124 and the auxiliary chamber 129. The opening 131 slopes downwardly from the main chamber 124 to the auxiliary chamber 129 and is adapted to receive a wick 132, the outer end of which rests on the bottom of the main chamber 124 and the inner end of which reaches into the lower part of the auxiliary chamber 129. An inverted cup-shaped flinger 133 is held in place on shaft 127 against shoulder 134 by means of the rotating part 135 of the bearing. An opening 137 is provided in the upper part of the flange 126.

In operation, the main chamber is partly filled with lubricant and, as the shaft 127 rotates, lubricant is conducted through the wick 132 into the lower part of auxiliary chamber 129. The lubricant is then picked up by flinger 133 and thrown upwardly and outwardly against the moving parts of the bearing. The excess lubricant passes on into the opening 138 above the bearing and, through the opening 137, back into the main chamber.

It will be readily understood that my structure provides a means for lubricating moving parts of bearings without having an excess of lubricant in contact with the moving parts. In addition, there are no rubbing contacts between rotating and stationary parts of the device.

Although I have shown my device in connection with an electric motor, it is apparent that it may be used on any machine employing a high-speed rotating shaft, and, although I have shown specific embodiments of my invention, modifications may be made by those skilled in the art without departing from the spirit and scope of my invention, as set forth in the appended claims.

I claim as my invention:

1. A bearing structure provided with a housing constituting a main oil reservoir chamber and with an auxiliary chamber adjacent to the shaft, the wall between the main and the auxiliary chambers extending above and below the oil level in the main chamber, said wall providing an opening between the two chambers at a point near the bottom of the main chamber, a capillary porous member disposed at the opening to restrict the flow of oil from the main to the auxiliary chamber to an amount which will lubricate the bearing without causing excessive friction, and means, rotatable with the shaft, and extending down into the auxiliary chamber to a point below the level of oil in the main chamber for atomizing and throwing oil from the auxiliary chamber to the bearing.

2. The invention as defined in claim 1, characterized by the housing also providing a second opening between the main and the auxiliary chambers to permit the return of the oil from the auxiliary chamber to the main chamber.

3. A high-speed antifriction guide bearing comprising a stationary part and a cooperating high-speed rotatable part, the stationary part including a main lubricant-chamber for storing oil, an auxiliary lubricant-chamber, the wall between the main and the auxiliary chambers extending above and below the oil level in the main chamber, said wall providing an opening between the two chambers at a point near the bottom of the main chamber, and capillary porous means disposed at the opening for filtering oil from the main chamber and supplying it to the auxiliary chamber at a very slow, restricted rate which will lubricate the bearing without causing excessive friction, in combination with a high-speed member carried by the rotatable part of the bearing and dipping down into said auxiliary lubricant-chamber to a point below the level of oil in the main chamber for producing a fine oil-mist, and means disposed at the top of the bearing for returning the oil to one of the lubricant-chambers.

4. A high-speed antifriction guide bearing comprising a moving bearing-member carried by a shaft, a cooperating stationary bearing-member, a main lubricant-chamber for storing oil below the moving bearing-member, an auxiliary lubricant-chamber for containing oil at a still lower level, the wall between the main and the auxiliary chambers extending above and below the oil level in the main chamber, said wall providing an opening between the two chambers at a point near the bottom of the main chamber, and capillary porous means disposed at the opening for filtering oil from the main chamber and supplying it to the auxiliary chamber at a very slow, restricted rate which will lubricate the bearing without causing excessive friction, in combination with a high-speed member carried by the moving bearing-member and dipping down into said auxiliary lubricant-chamber to a point below the level of oil in the main chamber for producing a fine oil-mist, and means disposed at the top of the bearing for returning the oil to the main lubricant-chamber.

5. A high-speed antifriction guide bearing comprising a moving bearing-member carried by a shaft, a cooperating stationary bearing-member, a main lubricant-chamber for storing oil below the moving bearing-member, an auxiliary lubricant-chamber for containing oil at a still lower level, capillary porous means for filtering oil from the main chamber and supplying it to the auxiliary chamber at a very slow, restricted rate, a high-speed flinger, moving at the same speed as the high-speed part of the bearing, dipping down into said auxiliary lubricant-chamber for producing a fine oil-mist and means disposed below the bearing for bypassing some of the larger liquid particles of oil, stirred up by said flinger, directly back into the main lubricant-chamber without passing through the bearing.

6. A high-speed antifriction guide bearing comprising a moving bearing-member carried by a shaft, a cooperating stationary bearing-member, a main lubricant-chamber for storing oil below the moving bearing-member, an auxiliary lubricant-chamber for containing oil at a still lower level, capillary porous means for filtering oil from the main chamber and supplying it to the auxiliary chamber at a very slow, restricted rate, a high-speed flinger, moving at the same speed as the high-speed part of the bearing, dipping down into said auxiliary lubricant-chamber for producing a fine oil-mist, means disposed below the bearing for bypassing some of the larger liquid particles of oil, stirred up by said flinger, directly back into the main lubricant-chamber without passing through the bearing, and means disposed above the bearing for returning the oil to one of the lubricant-chambers.

7. A high-speed antifriction guide bearing comprising a moving bearing-member carried by a shaft, a cooperating stationary bearing-member, a main lubricant-chamber for storing oil below the moving bearing-member, an auxiliary lubricant-chamber for containing oil at a still lower level, capillary porous means for filtering oil from the main chamber and supplying it to the auxiliary chamber at a very slow, restricted rate, a high-speed flinger, moving at the same speed as the high-speed part of the bearing, dipping down into said auxiliary lubricant-chamber for producing a fine oil-mist, means disposed below the bearing for bypassing some of the larger liquid particles of oil, stirred up by said flinger, directly back into the main lubricant-chamber without passing through the bearing, and means disposed above the bearing for returning the oil to the main lubricant-chamber.

8. The invention as defined in claim 3, characterized by the fact that the capillary porous means is a wick which first rises and then falls in conducting oil from the main lubricant-chamber to the auxiliary lubricant-chamber.

9. The invention as defined in claim 7, characterized by the fact that the capillary porous means is a wick which first rises and then falls in conducting oil from the main lubricant-chamber to the auixilary lubricant-chamebr.

10. In combination, a vertical shaft, a ball bearing disposed at an intermediate point between the ends of the shaft, a supporting frame for the ball bearing comprising a tubular wall surrounding, but not touching, the shaft below the bearing, and constituting the inner wall of an annular chamber below the bearing, a tubular partition surrounding, and spaced from, said tubular wall for dividing said annular chamber into an outer chamber and an inner chamber, said outer chamber being an oil-storing chamber, fibrous means at the bottom of said tubular partition for filtering oil from the outer chamber to the inner chamber at a slow rate, and a tubular flinger carried by the shaft and depending down to a point near the bottom of the inner chamber without touching either said tubular wall or said tubular partition, characterized by a supporting sleeve at the top of said tubular flinger having a plurality of openings constituting communicating means between the space within the tubular flinger and the bearing.

11. In combination, a vertical shaft, a ball bearing disposed at an intermediate point between the ends of the shaft, a supporting frame for the ball bearing comprising a tubular wall surrounding, but not touching, the shaft below the bearing, and constituting the inner wall of an annular chamber below the bearing, a tubular partition surrounding, and spaced from, said tubular wall for dividing said annular chamber into an outer chamber and an inner chamber, said outer chamber being an oil-storing chamber, fibrous means at the bottom of said tubular partition for filtering oil from the outer chamber to the inner chamber at a slow rate, and a tubular flinger carried by the shaft and depending down to a point near the bottom of the inner chamber without touching either said tubular wall or said tubular partition, characterized by a supporting sleeve at the top of said tubular flinger having a plurality of openings constituting communicating means between the space within the tubular flinger and the bearing, and a return-path for returning oil from the space above the bearing to the oil-storing chamber.

12. In combination, a vertical shaft, a ball bearing disposed at an intermediate point between the ends of the shaft, a supporting frame for the ball bearing comprising a tubular wall surrounding, but not touching, the shaft below the bearing, and constituting the inner wall of an annular chamber below the bearing, a tubular partition surrounding, and spaced from, said tubular wall for dividing said annular chamber into an outer chamber and an inner chamber, said outer chamber being an oil-storing chamber, fibrous means at the bottom of said tubular partition for filtering oil from the outer chamber to the inner chamber at a slow rate, and a tubular flinger carried by the shaft and depending down to a point near the bottom of the inner chamber without touching either said tubular wall or said tubular partition, characterized by a supporting sleeve at the top of said tubular flinger having a plurality of openings constituting communicating means between the space within the tubular flinger and the bearing, a return-path for returning oil from the space above the bearing to the oil-storing chamber, and a communicating-space at the top of the tubular partition for returning oil to the oil-storing chamber.

13. A lubricating device for a bearing supporting a vertical shaft including an oil reservoir below the bearing and surrounding the shaft, means including an annular oil feeding element carried by said shaft and extending below the level of oil in said reservoir for feeding oil to the bearing, a baffle surrounding said oil feeding element and extending above and below the oil level in said reservoir, said baffle providing an outer reservoir-chamber and an inner feeding-element chamber and providing a point of communication between said chambers for admitting oil to said feeding element, and a porous member disposed at said point of communication for limiting the flow of oil from said reservoir to said feeding element to an amount which will lubricate the bearing without causing excessive friction.

14. A high-speed anti-friction guide bearing comprising a moving bearing-member carried by a shaft, a cooperating stationary bearing-member, a main lubricant-chamber for storing oil below the moving bearing-member, an auxiliary lubricant-chamber for containing oil at a still lower level, capillary porous means for filtering oil from the main chamber and supplying it to the auxiliary chamber at a very slow, restricted rate, a high-speed flinger, moving at the same speed as the high-speed part of the bearing, dipping down into said auxiliary lubricant-chamber for producing a fine oil-mist, and means disposed above the bearing for returning the oil to one of the lubricant-chambers.

15. A high-speed antifriction guide bearing comprising a moving bearing-member carried by a shaft, a cooperating stationary bearing-member, a main lubricant-chamber for storing oil below the moving bearing-member, an auxiliary lubricant-chamber for containing oil at a still lower level, capillary porous means for filtering oil from the main chamber and supplying it to the auxiliary chamber at a very slow, restricted rate, a high-speed flinger, moving at the same speed as the high-speed part of the bearing, dipping down into said auxiliary lubricant-chamber for producing a fine oil-mist, and means disposed above the bearing for returning the oil to the main lubricant-chamber.

16. In combination, a vertical shaft, a ball bearing disposed at an intermediate point between the ends of the shaft, a supporting frame for the ball bearing comprising a tubular wall surrounding, but not touching, the shaft below the bearing, and constituting the inner wall of an annular chamber below the bearing, a tubular partition surrounding, and spaced from, said tubular wall for dividing said annular chamber into an outer chamber and an inner chamber, said outer chamber being an oil-storing chamber, fibrous means at the bottom of said tubular partition for filtering oil from the outer chamber to the inner chamber at a slow rate, and a tubular flinger carried by the shaft and depending down to a point near the bottom of the inner chamber without touching either said tubular wall or said tubular partition.

17. A lubricating device for a bearing supporting a shaft including a main oil-reservoir chamber, an auxiliary lubricant-chamber, the wall between the main and the auxiliary chambers extending above and below the oil level in the main chamber, said wall providing an opening between the two chambers at a point near the bottom of the main chamber, capillary porous means disposed at the opening for filtering oil from the main chamber and supplying it to the auxiliary chamber at a very slow, restricted rate which will lubricate the bearing without causing excessive friction, and means including an oil-feeding element carried by the shaft and extending down into the auxiliary chamber to a point below the level of oil in the main chamber for feeding oil to the bearing.

18. A bearing structure provided with a housing constituting a main oil reservoir chamber and with an auxiliary chamber adjacent to the shaft, the wall between the main and the auxiliary chambers extending above and below the oil level in the main chamber, capillary porous means for filtering oil from the main chamber and supplying it to the auxiliary chamber at a very slow rate, restricted to an amount which will lubricate the bearing without causing excessive friction, and means, rotatable with the shaft, and extending down into the auxiliary chamber to a point below the level of oil in the main chamber for atomizing and throwing oil from the auxiliary chamber to the bearing.

19. A lubricating device for a bearing supporting a shaft including a main oil-reservoir chamber, an auxiliary lubricant-chamber, the wall between the main and the auxiliary chambers extending above and below the oil level in the main chamber, capillary porous means for filtering oil from the main chamber and supplying it to the auxiliary chamber at a very slow, restricted rate which will lubricate the bearing without causing excessive friction, and means including an oil-feeding element carried by the shaft and extending down into the auxiliary chamber to a point below the level of oil in the main chamber for feeding oil to the bearing.

HARRY D. ELSE.